(12) United States Patent
Chang et al.

(10) Patent No.: US 9,348,527 B2
(45) Date of Patent: May 24, 2016

(54) STORING DATA IN PERSISTENT HYBRID MEMORY (71) Applicant: HEWLETT-PACKARD DEVELOPMENT COMPANY, L.P., Houston, TX (US)

(72) Inventors: Jichuan Chang, Sunnyvale, CA (US); Parthasarathy Ranganathan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/716,473

(22) Filed: May 19, 2015

(65) Prior Publication Data
US 2015/0254014 A1 Sep. 10, 2015

Related U.S. Application Data

(63) Continuation of application No. 13/549,819, filed on Jul. 16, 2012, now Pat. No. 9,063,864.

(51) Int. Cl.
*G06F 12/00* (2006.01)
*G06F 3/06* (2006.01)
*G06F 12/08* (2016.01)

(52) U.S. Cl.
CPC .......... *G06F 3/0619* (2013.01); *G06F 3/064* (2013.01); *G06F 3/0685* (2013.01); *G06F 3/0688* (2013.01); *G06F 12/0806* (2013.01); *G06F 12/0895* (2013.01); *G06F 12/0804* (2013.01); *G06F 12/0866* (2013.01); *Y02B 60/1225* (2013.01)

(58) Field of Classification Search
None
See application file for complete search history.

(56) References Cited

U.S. PATENT DOCUMENTS

| 4,713,755 | A | * | 12/1987 | Worley, Jr. | ............ | G06F 9/3812 |
| | | | | | | 707/999.004 |
| 6,438,650 | B1 | * | 8/2002 | Quach | ................ | G06F 12/0859 |
| | | | | | | 711/100 |
| 6,446,145 | B1 | | 9/2002 | Har et al. | | |
| 6,662,173 | B1 | * | 12/2003 | Hammarlund | ...... | G06F 12/0804 |
| 7,020,751 | B2 | | 3/2006 | Kershaw | | |
| 7,424,587 | B2 | | 9/2008 | Caulkins et al. | | |
| 7,778,078 | B2 | | 8/2010 | Nagadomi et al. | | |
| 7,924,635 | B2 | | 4/2011 | Kim | | |
| 8,060,719 | B2 | | 11/2011 | Radke et al. | | |

(Continued)

OTHER PUBLICATIONS

Gaurav Dhiman, et al.; "PDRAM: a hybrid PRAM and DRAM main memory system" DAC 2009.

(Continued)

*Primary Examiner* — Brian Peugh
(74) *Attorney, Agent, or Firm* — Fabian VanCott (57) ABSTRACT

Storing data in persistent hybrid memory includes promoting a memory block from non-volatile memory to a cache based on a usage of said memory block according to a promotion policy, tracking modifications to the memory block while in the cache, and writing the memory block back into the non-volatile memory after the memory block is modified in the cache based on a writing policy that keeps a number of the memory blocks that are modified at or below a number threshold while maintaining the memory block in the cache.

20 Claims, 8 Drawing Sheets

(56) References Cited

U.S. PATENT DOCUMENTS

| | | | | |
|---|---|---|---|---|
| 8,977,818 B2* | 3/2015 | Wang | ............... | G06F 12/0802 711/118 |
| 2002/0184449 A1 | 12/2002 | Kershaw | | |
| 2003/0084248 A1* | 5/2003 | Gaither | ............... | G06F 12/0804 711/133 |
| 2003/0084251 A1* | 5/2003 | Gaither | ............... | G06F 12/122 711/133 |
| 2008/0181018 A1 | 7/2008 | Nagadomi et al. | | |
| 2009/0313416 A1 | 12/2009 | Nation | | |
| 2010/0110748 A1 | 5/2010 | Best | | |
| 2011/0191535 A1 | 8/2011 | Yuasa | | |
| 2013/0159630 A1* | 6/2013 | Lichmanov | ............... | G06F 12/126 711/133 |

OTHER PUBLICATIONS

Luiz Ramos, et al.; "Page Placement in Hybrid Memory Systems"; ICS 2011; http://www.cs.rutgers.edu/~ricardob/papers/ics11.pdf.

Ping Zhou, et al.; "A Durable and Energy Efficient Main Memory Using Phase Change Memory Technology"; ISCA 2009.

Xiangyu Dong, et al.; "AdaMS: Adaptive MLC/SLC Phase-Change Memory Design for File Storage"; ASP-DAC 2011.

Tian, W. et al., Optimal Task Allocation on Non-volatile Memory Based Hybrid Main Memory, (Research Paper), Proceedings of the 2011 ACM Symposium on Research in Applied Computation, 2011, pp. 1-6.

* cited by examiner

STORING DATA IN PERSISTENT HYBRID MEMORY

BACKGROUND

Hybrid memory generally includes two different memory structures to hold data. One example includes data storage that uses both volatile and non-volatile memory. Non-volatile memory does not require power to maintain the stored data. However, it typically takes longer to write or retrieve data from non-volatile memory as compared with volatile memory.

One example of such hybrid memory includes non-volatile memory and a cache that uses dynamic random-access memory (DRAM). Data that is more frequently used is generally stored in the DRAM for quicker retrieval. Less frequently used data is generally stored in the non-volatile memory. Storing frequently used data in DRAM allows that data to be accessed more quickly, but also has other benefits such as reduced energy consumption and reduced wear-out due to fewer non-volatile memory writes.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

The information in the non-volatile memory storage is not updated each time the memory in the cache is updated. As a consequence, the memory in the cache may be inconsistent with the corresponding data in the non-volatile memory. Since information in the volatile memory may be lost in the absence of power, the information in the cache may be lost in the event of a power failure.

The principles described herein include, for example, a method for storing data in a hybrid structure that balances the need to reduce writes in the non-volatile memory storage while minimizing the risk of information loss in a cache in the event of a power failure. Examples of such a method may include promoting a memory block from non-volatile memory to a cache based on a usage policy of the memory block, tracking modifications to the memory block while in the cache, and writing the memory block back into the non-volatile memory after the memory block is modified in the cache according to a write back policy while, optionally, maintaining the modified memory block in the cache to assist later accesses.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
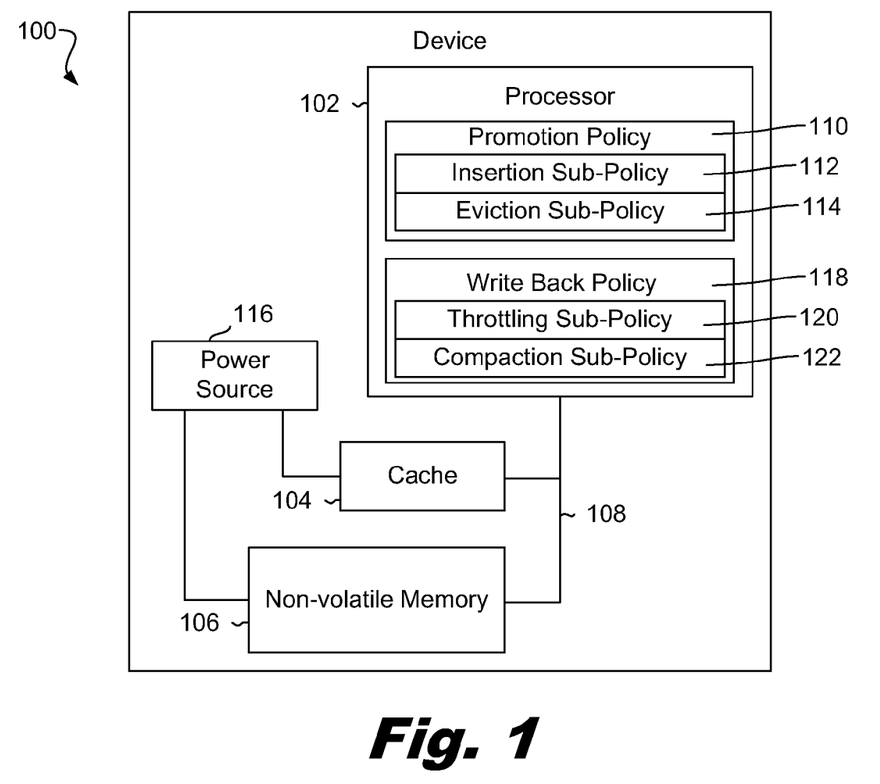
FIG. 1 is a diagram of an illustrative memory device, according to principles described herein.

FIG. 1 is a diagram of an illustrative device (100), according to principles described herein. In this example, the device (100) has a processor (102), a cache (104) that uses volatile memory, and a non-volatile memory location (106). In some examples, the memory device (100) is any device that uses memory. For example, a non-exhaustive list of memory devices may include computers, memory storage, networking devices, laptops, electronic tablets, mobile devices, phones, watches, memory sticks, hard drives, servers, cameras, instruments, electronic devices, other devices that use memory, or combinations thereof.

In some examples, the processor (102) utilizes data stored in either the cache (104) or the non-volatile memory location (106). Examples of non-volatile memory include, but are not limited to, memristors, Phase-Change Memory (PCM), Spin-Torque Transfer RAM (STT-RAM), hard drives, optical discs, flash memory devices, other forms of non-volatile memory, or combinations thereof. In some examples, the non-volatile memory location (106) has a slower access time, but an increased storage capacity than the cache (104). The cache (104), for example, may be a memory cache, a processor memory cache, an off-chip memory cache, a random access memory cache, or combinations thereof. The memory cache may contain data, executable code, other information, or combinations thereof. In some examples, the cache uses dynamic random access memory (DRAM), static random access memory (SRAM), another volatile memory, faster non-volatile memory, or combinations thereof.

In some examples, the processor (102), the cache (104), and the non-volatile memory location (106) are connected by a bus (108). In some examples, the cache (104) and the non-volatile memory location (106) are in wireless communication with the processor (102). In some examples, the memory locations are memory levels or tiers within a memory hierarchy structure. In some examples, the memory system has a three-dimensional stacked or other stacked memory architecture.

In some examples, data in the cache (104) and the non-volatile memory location (106) is stored in a memory matrix made up of rows and columns. In such examples, each memory bit may be addressable. In some examples, multiple data bits are grouped together to form a memory block. The memory blocks may be sequentially arranged within the memory matrix or portions of the blocks may be spatially disjointed, but read together by the processor (102).

To speed up processing time and to reduce the number of writes to the non-volatile memory location (106), hot data blocks may be copied and written into the cache and referenced from the faster cache memory. A process for copying information from such a non-volatile location (106) to a cache (104) may be referred to as promoting the data. Hot data blocks may refer to those memory blocks that are frequently being used. A promotion policy (110) may determine which blocks in the non-volatile memory are hot and should therefore be promoted into the cache. The promotion policy (110) may be based on a number of writes to the memory blocks in the non-volatile memory. In other examples, the promotion policy considers a number of writes and reads to a memory block. In some examples, the promotion policy promotes memory blocks that are more frequently used within a predefined time period. For example, the promotion policy may include promoting memory blocks that have been used twice within a minute or some other frequency and/or time duration. Also, the promotion policy may change over time to reflect activity with the memory device. For example, if the cache is empty, the usage amount needed to cross the promotion threshold may be lower than if the cache is full of frequently used memory blocks. In examples where more memory blocks are worthwhile to promote to the cache than space is available, the promotion policy may determine which of these memory blocks is most worthwhile to promote based on a cost benefit analysis.

When the promotion policy indicates that a memory block should be promoted, the promotion policy may employ an insertion sub-policy (112) to determine where to insert the memory block within the cache. Some locations within the cache may be designated for more essential information than other locations within the cache. For example, a prime location may be designated for memory blocks that the promotion policy predicts will be heavily used, while other locations may be designated for memory blocks that the promotion policy indicates will be used less frequently. To insert the memory block in the position that the promotion policy determines to be the most appropriate, the metadata information regarding the relevant ordering of memory blocks in the memory cache may need to be reorganized. In some examples, to make room for the memory block to be promoted, a memory block already written to the cache memory may need to be evicted from the cache. Such a circumstance may occur when the cache memory is limited. In some examples, the number of memory blocks in the cache memory that are modified and hence inconsistent with non-volatile memory is limited to an amount of data that is capable of being written back to the non-volatile memory location with a back-up power source in the event of a power failure. In other examples, the memory cache is limited for other considerations. The promotion policy (110) may include an eviction sub-policy (114) that may determine which of the memory blocks remaining in the cache is most appropriate to remove from the cache. If the memory block to be evicted is inconsistent with the corresponding memory block in the non-volatile memory, the memory block to be evicted may be written back to the non-volatile memory before it is removed.

After the memory block has been promoted into the cache (104), modifications or changes made to that memory block may be made in the cache (104) while the corresponding memory block in the non-volatile memory location (106) remains in the same condition as when the memory block was promoted. Such a situation allows those memory blocks that are frequently changing to be in an environment where the changes may be made easier. For example, making changes to the memory block in the cache (104) may consume less energy, may be quicker, and may have less wear fatigue than writing memory in the non-volatile memory location (106).

In the event of a power failure, a back-up power source (116) may provide to the cache (104) and the non-volatile memory location (106) enough power to write the changes made to the cache (104) back to the non-volatile memory location (106) to prevent data loss. However, to minimize the amount of power needed in a power failure, the processor (102) may follow a write back policy (118) that writes some of the memory blocks back into the non-volatile memory location over normal operation before the power failure (106). Such a policy may write selected memory blocks in the cache (104) back to the non-volatile memory location (106) at a rate that is much less frequent than the changes made to the memory block in the cache (104). For example, the write back policy may include predicting when a memory block is likely done being modified. At such a time, the write back policy (118) may write the information in the memory block back into the non-volatile memory location (106) so that the memory in both the cache (104) and the non-volatile memory location (106) are consistent. In such an event, the cache (104) may track which memory blocks have been written back into the non-volatile memory (106). Then, in the event of a power failure, the cache may know which memory blocks are still inconsistent with the non-volatile memory location (106). Thus, during a power failure, the cache (104) may write just those memory blocks back into the non-volatile memory location that are inconsistent ensuring enough resources to get all of the changes of all of the memory blocks written back into the non-volatile memory location (106).

The write back policy (118) may have a compaction policy (122) that causes multiple the memory blocks in the cache (104) that are ready for write backs to the non-volatile memory location (106) to be written back in a batch. By writing multiple ready memory blocks at the same time, fewer resources may be consumed in the writing back process. Also, the write back policy (118) may have a throttling sub-policy (120) that limits the write backs to a time when convenient. For example, if the processor (102) is executing on demand requests, the writing back may be put on hold to free up the cache and non-volatile memory for the on demand requests. An on demand request may be a request that is made by a user to be performed by the processor at the time that the user makes the request. In some examples, writing back is performed in the background of the memory device so as to create as little interference with the other operations of the memory device (100). In some examples, the throttling sub-policy (120) allows some interference to be created if the need to write back is great enough and the other operations of the memory device (100) are less urgent.

The process of promoting the memory blocks and writing the memory blocks back to the non-volatile memory may be transparent to the user. For example, the throttling sub-policy (120) may cause the write backs to occur at a time unnoticed by the user. Further, a user may find all of the information preserved after power is restored from a power failure without action on the user's part.

Figure 2:
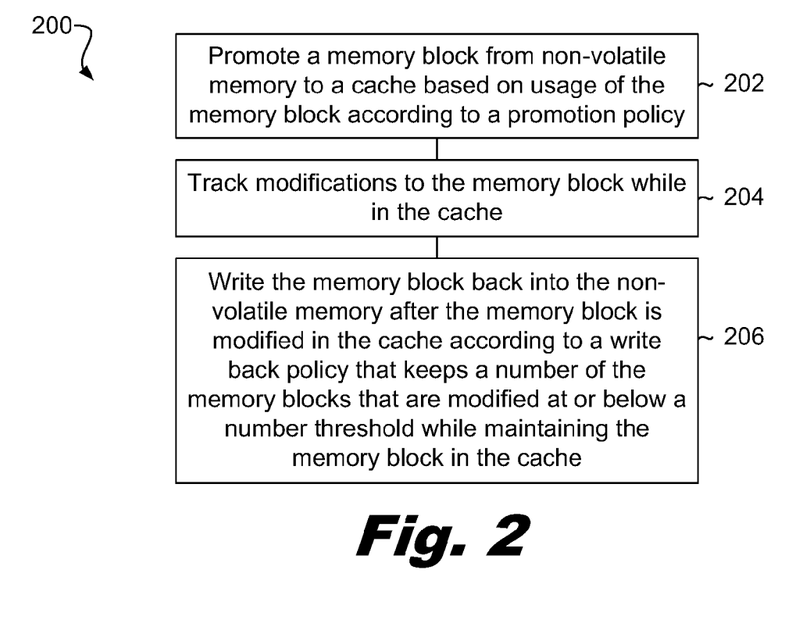
FIG. 2 is a diagram of an illustrative method for storing data, according to principles described herein.

FIG. 2 is a diagram of an illustrative method (200) for storing data, according to principles described herein. In this example, the method (200) includes promoting (202) a memory block from non-volatile memory to a cache based on usage of the memory block according to a promotion policy, tracking (204) modifications to the memory block while in the cache (and in non-volatile memory), and writing (206) the memory block back into the non-volatile memory after the memory block is modified in the cache according to a write back policy that keeps a number of said memory blocks that are modified at or below a number threshold while maintaining the modified memory block in the cache.

In some examples, the method (200) includes tracking usage of the memory blocks on a per memory block basis in the non-volatile memory. Tracking the usage may include tracking the writes to each of the memory blocks and recording the frequency to which the memory blocks are written. The promotion policy may include promoting memory blocks based on the frequency of writes to a specific memory block. In some examples, promoting a memory block includes evicting a second memory block in the cache back to the non-volatile memory. Further, in some examples, promoting a memory block includes inserting the memory block in a position in the cache based on the promotion policy.

In some examples, the write back policy includes a throttling sub-policy of writing back the modified memory between on demand requests. For example, the throttling sub-policy may control when the writing back occurs to reduce or eliminate interference with other processes of the memory device, such as executing on demand requests. The writing back may occur while the memory device is in electrical communication with a primary power source and there are plentiful resources to write back the memory blocks. However, writing back may be less of a priority than others processes being executed by the memory device. Thus, the throttling sub-policy may balance the needs of writing back with the processor's other demands. Writing back modified blocks, in the background and even when they are not required, may reduce the resources used from back-up power sources, such as a battery or super capacitor, during a power failure.

The write back policy may include predicting when a memory block is finished receiving modifications and writing such memory blocks back together in a group to reduce resource consumption. For example, statistics tracked by the memory device may show that a memory device that is heavily modified within a short period of time followed by a predetermined duration is likely to be finished receiving modifications. In such an event, the memory device may write back the memory block to the non-volatile memory. If a power failure occurs after the memory block is written back to non-volatile memory and the memory block has received no additional changes, the memory device may skip writing back that memory block because the corresponding memory block in the non-volatile memory is consistent with the memory block in the cache. Thus, in this case, writing back the memory block to the non-volatile memory saves the limited back-up power resources for writing back other memory blocks or other powering down tasks.

Figure 3:
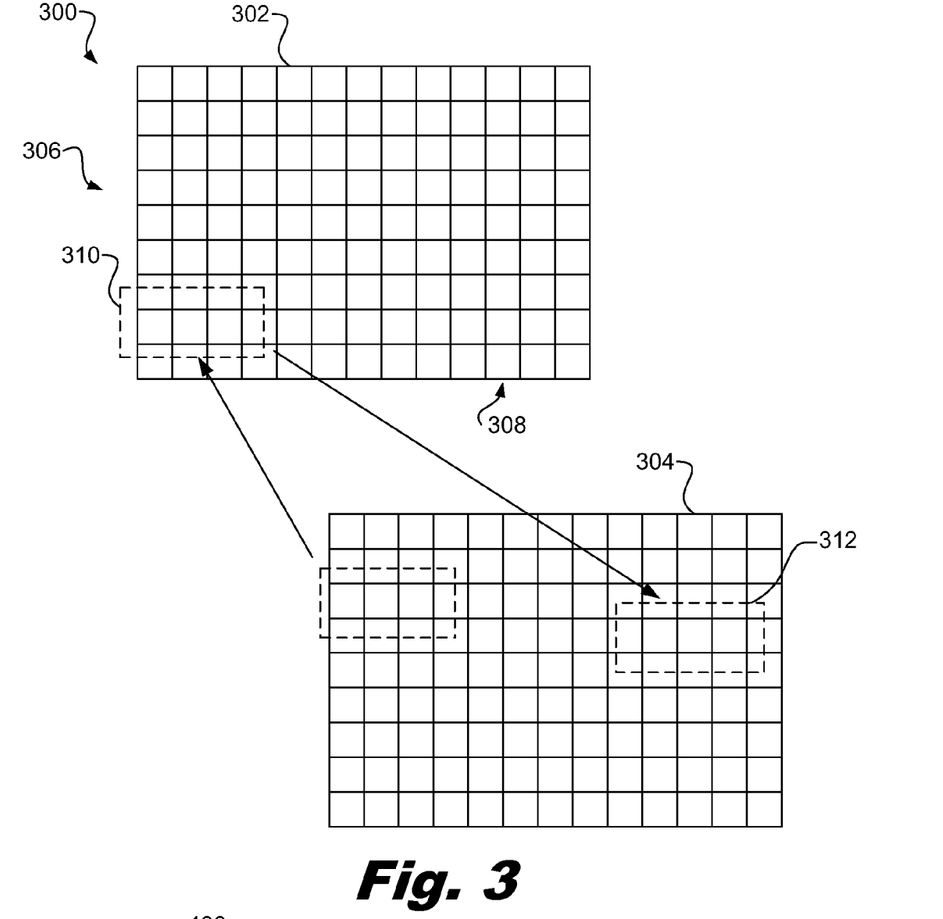
FIG. 3 is a diagram of an illustrative memory structure, according to principles described herein.

FIG. 3 is a diagram of an illustrative memory structure (300), according to principles described herein. In this example, the structure (300) includes cache memory (302) and a non-volatile memory (304). Both the cache memory (302) and the non-volatile memory (304) may have memory matrix arrays, where each bit of information has a unique physical position and address. The matrixes may have a plurality of rows (306) and a plurality of columns (308).

In the example of FIG. 3, a first memory block (310) from the non-volatile memory (304) is being promoted to the cache memory (302). In this example, an insertion sub-policy determines that the first memory block (310) should be inserted into the cache memory (302) with a certain ordering information. Thus, to make room for the first memory block (310), the second memory block (312) is selected by the eviction sub-policy to give up its room for the first memory block (310). According to an eviction sub-policy, the cost benefit of having the second memory block (312) in the cache memory (302) is no longer sufficient enough to justify the second memory block (312) remaining in the cache memory (302). As a consequence, the second memory block is written into the non-volatile memory (304) and erased from the cache memory (302) as the first memory block (312) is written into the second memory block's prior location.

The eviction sub-policy may be based on factors that are relevant to whether is it likely that the memory block to be evicted will be modified in the near future. For example, the cache memory (302) may track the usage of the memory blocks and use the past history of the memory blocks to predict future activity. In the example of FIG. 3, the recent past history of the third data block may have followed a pattern that indicates that it is less likely to be modified in the near future than the other memory blocks in the cache memory (302).

In other examples, the cache memory has a pecking order based on access characteristics of various memory blocks that automatically determines which memory block will be evicted. In such an example, the memory block to be promoted may be inserted a location in the cache memory and ordering information will be updated and made consistent with its priority in the pecking order. In the example of FIG. 3, the first memory block (310) may have been inserted into the second to last position of the pecking order since just the second memory block (312) was affected. In some examples, the memory block to be promoted affects the pecking order of all of the memory blocks in the cache memory. In examples where the eviction sub-policy is based on a pecking order determined by access history, an evicted memory block may be re-promoted to the cache memory (302) from the non-volatile memory (304) in the event that the promotion policy determines that the evicted memory block is hot enough to be promoted.

The second memory block (312) may be written back to the same location from which the second memory block was originally promoted within the non-volatile memory (304). In the non-volatile memory (304), the memory blocks may remain at a fixed location regardless of whether there is a copy of that memory block in the cache memory (302) or not. Those memory blocks within the non-volatile memory that do not have copies in the cache memory (302) may be directly modified in the non-volatile memory. On the other hand, those memory blocks in the non-volatile memory (304) that do have copies in the cache memory (302) may be unaltered while the corresponding copies in the cache memory (302) are receiving modifications.

The memory blocks may have a fine granularity such that information in the cache (302) and the non-volatile memory (304) is stored in relatively small groups. In some examples, a fine grain memory block is smaller than a page, a matrix row, a matrix column, a hundred kilobytes, ten kilobytes, a kilobyte, or combinations thereof. Because the system may promote just those relatively small memory blocks that are hot, the memory device may save area on the cache memory (302), save overhead due to the reduce amount of data promoted and/or moved, save energy, save time, or combinations thereof.

Figure 4:
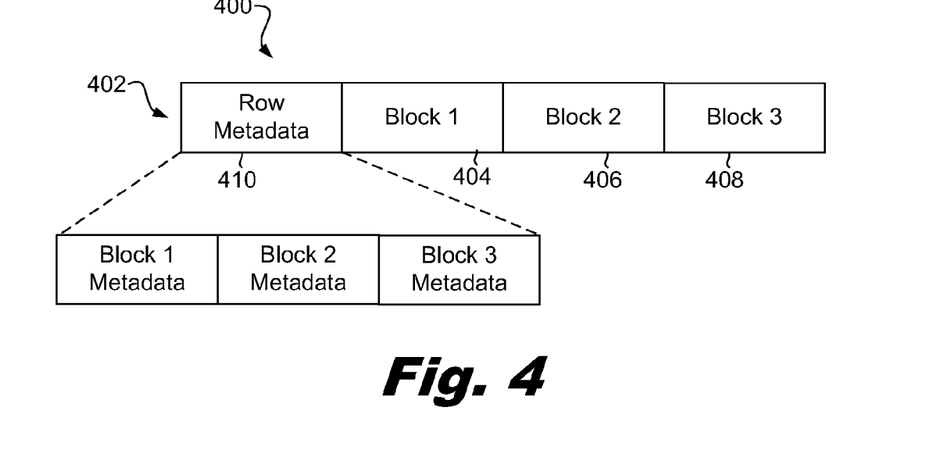
FIG. 4 is a diagram of an illustrative memory structure, according to principles described herein.

FIG. 4 is a diagram of an illustrative memory structure (400), according to principles described herein. In this example, a row (402) of a memory matrix has a first block (404), a second block (406), and third block (408) and metadata (410) about these memory blocks (404, 406, 408). In this example, the metadata (410) is stored spatially close to the information that it describes.

The usage of each memory block may be tracked on a per memory block basis. For example, the metadata (410) for each memory block may be stored independently of the metadata for other memory blocks. The metadata (410) may track usage statistics about each block (404, 406, 408) in the row (402). For example, the metadata (410) may show the times and the frequency that each block is referenced. The metadata (410) may be updated each time the data is read or written to the memory blocks. These statistics may be used by the system to determine, according to the promotion policies, which memory block should be promoted. In some examples, statistics are stored in the same memory location with the memory blocks that it is describing or the statistics may be stored in other locations or other areas.

The metadata (410) may include information about whether the memory block has information written to it. For example, a "1" stored in a particular metadata field may indicate that information has been written to the memory block. In some examples, when a memory block has been written to or has been changed, the memory block is referred to as a dirty block. The memory device may use these metadata fields to determine which blocks are dirty and from which dirty blocks to promote to the cache memory.

Further, in the cache memory, the metadata fields that indicate that the memory block is dirty may be used when determining which memory blocks to write back to the non-volatile memory. The metadata field that indicates that a block is dirty may be changed after the memory block is written back into the non-volatile memory, or in other words, the memory block is figuratively scrubbed clean. During a first pass to determine which memory blocks to write back to the non-volatile memory, the memory device may determine which memory blocks are clean and which are dirty. Further, during a power failure, the memory device may write back all of the dirty memory blocks since all of the clean memory blocks are consistent with the information in the non-volatile memory.

In some examples, the memory device has a dynamic promotion policy. For example, the promotion policy may include procedures to experiment with different promotion approaches to refine the policy to become more effective. The promotion policy may initially apply a particular promotion procedure to just a selected group of memory blocks and a different promotion policy to other memory blocks. As these procedures are carried out, the memory device may compare the efficiency of the different procedures to fine tune the promotion policy. Further, the memory device may experiment with the other policies concerning the transfer and storage of the memory to fine tune those policies as well.

Figure 5:
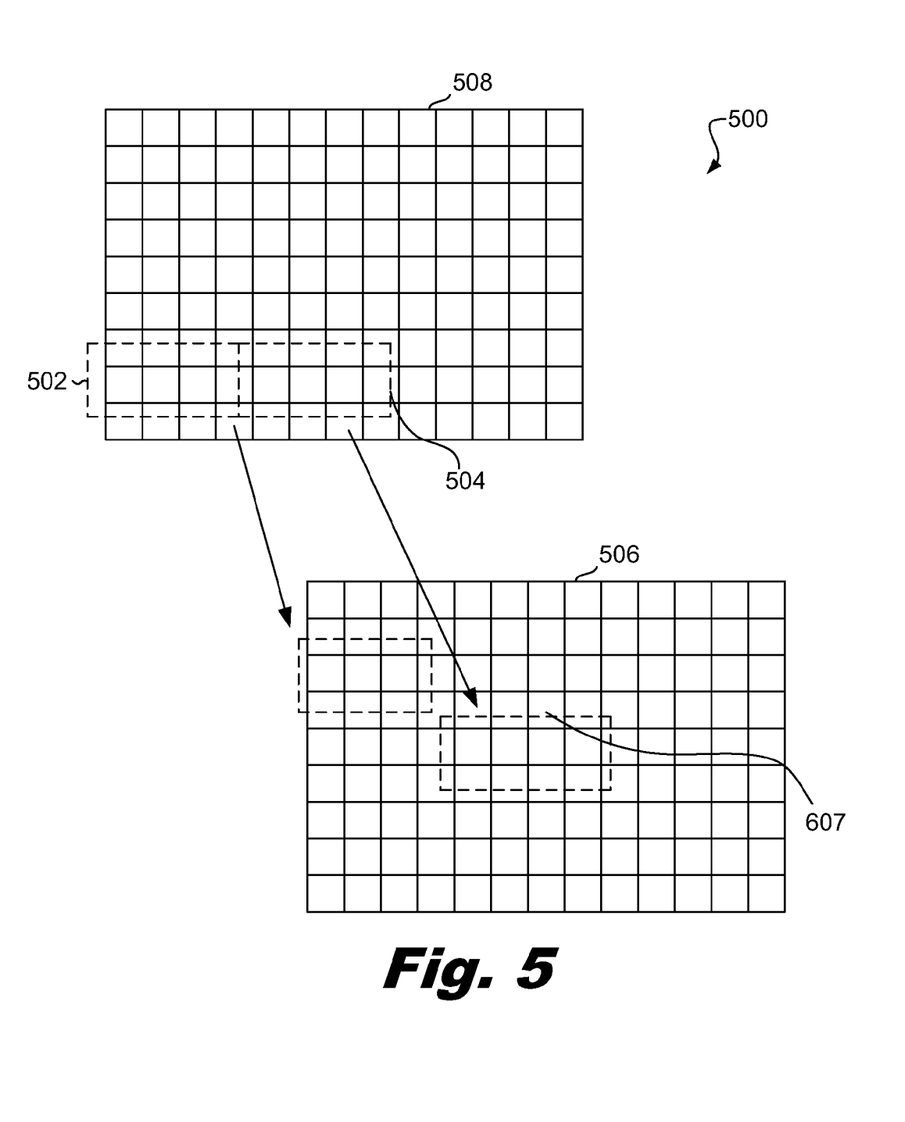
FIG. 5 is a diagram of an illustrative memory structure, according to principles described herein.

FIG. 5 is a diagram of an illustrative memory structure (500), according to principles described herein. In this example, information from a first memory block (502) and a second memory block (504) is being written back to the non-volatile memory (506) from the cache memory (508). However, in this example, the data in the first and second memory blocks (506, 508) is being maintained in the cache memory (508), although their metadata are updated from dirty blocks to clean blocks.

In this example, the first and second memory blocks (502, 504) are written back to the non-volatile memory (506) in the same location the first and second memory blocks (502, 504) were located prior to being promoted into the cache memory (508). In some examples, the memory device tracks the write backs to the non-volatile memory (506). For example, in a field that determines whether the non-volatile memory is read-write or read-only, the memory device may cause the metadata to reflect that written back memory blocks are read-only. In such an example, the memory device may distinguish memory blocks that are available for promotion to the cache and those memory blocks that should not be considered for promotion. For example, when the memory device is determining which memory blocks to promote to the cache memory (508), the memory device may consider any of the memory blocks in the non-volatile memory (506) that are considered read-only to be ineligible for promotion.

When the write back policy indicates that at least one of the memory blocks is to be written back, the memory device may determine whether other memory blocks in the cache memory (508) are also ready to write back at the same time, and may be grouped to write into the same non-volatile memory row, to conserve resources that are consumed during write backs. In some examples, the write back policy includes writing back memory blocks once a predetermined number of memory blocks are ready to be written back and then writing back those memory blocks together. In other examples, the write back policy includes writing back any memory block that is ready for a write back at predetermined intervals. For example, the write back policy may include writing back memory blocks every five minutes. If no memory blocks are deemed appropriate to write back to the non-volatile memory (506) after a five minute time period has lapsed, no memory blocks are written back. On the other hand, if three memory blocks are determined to be appropriate for writing back, then those three memory blocks may be written back together.

In some examples, the write back policy considers the amount of power that would be available to write memory blocks back in the event of a power failure. The write back policy may determine how many blocks may be written back with that amount of available power to determine a dirty memory block number threshold. The memory device may keep track of the number of dirty memory blocks in the cache, and strive to keep the number of dirty memory blocks in the cache at or below that number threshold to ensure enough back up power to write back the dirty memory blocks in the event of a power failure.

Figure 6:
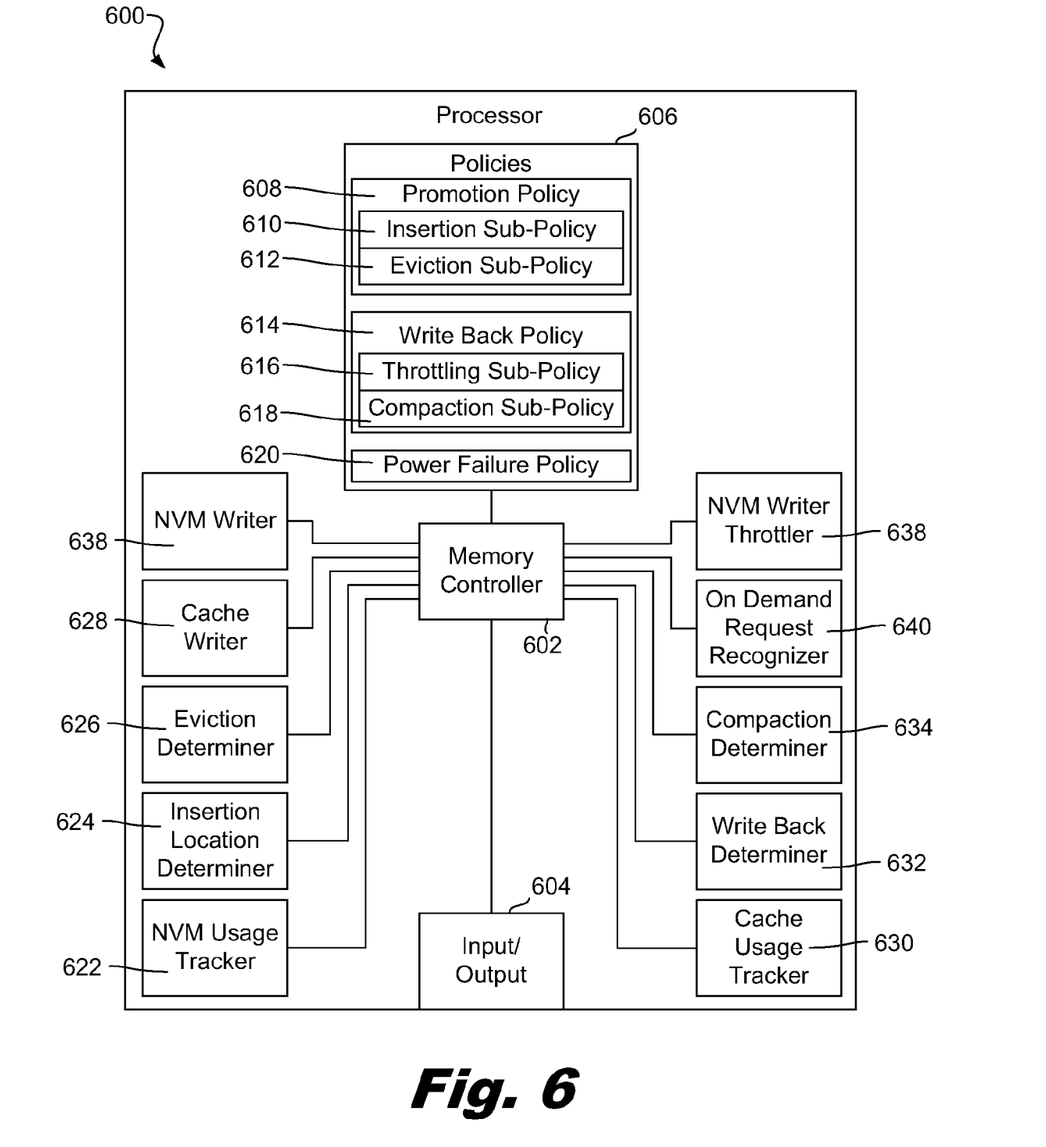
FIG. 6 is a diagram of an illustrative processor, according to principles described herein.

FIG. 6 is a diagram of an illustrative processor (600), according to principles described herein. The processor (600) may be caused to operate by computer readable program code stored in a computer readable storage medium in communication with the processor (600). The computer readable storage medium may be tangible and/or non-transitory. In this example, the processor (600) has a memory controller (MC) (602) that is in communication with an input/output (604). The input/output (604) may be in communication with the cache, the non-volatile memory, primary power sources, back-up power sources, local locations, wireless location, other locations, and combinations thereof.

The MC (602) may be in communication with policies (606) that determine various aspects of the processors operation. For example, one of the policies (606) that may be in communication with the MC (602) is a promotion policy (608). The promotion policy (608) may determine which memory blocks in the non-volatile memory should be promoted to the cache. The promotion policy (608) may incorporate a number of factors into the decision to promote a memory block. For example, the promotion policy (608) may rely on the statistics kept by the non-volatile memory and/or the cache, the frequency of usage of each memory block in the non-volatile memory and/or in the cache, the number or writes and/or reads to each of the memory blocks in either of the non-volatile memory or the cache, other factors, or combinations thereof.

The promotion policy (608) may also have an insertion sub-policy (610) that determines where the memory block to be promoted should be inserted into the cache memory. In examples that incorporate such an insertion sub-policy (610), the location in the cache may determine on how hard it is to evict a memory block from the cache, how long the memory block will remain in the cache, how often the memory block should be considered for write backs, other considerations, or combinations thereof.

Also, the promotion policy (608) may have an eviction sub-policy (612), which determines when a memory block in the cache should be evicted to the non-volatile memory to make room for a memory block that is being promoted. In some examples, the eviction policy uses cache stored statistics to determine which memory block to evict, the location of memory blocks, other considerations, or combinations thereof. In some examples, the eviction policy is inactive until the cache is full. In some examples, the cache's space is limited due to space limitations. In other examples, the cache has a limited amount of available space for caching memory blocks that is limited by the amount of back-up power that is available to write back dirty blocks during a power failure.

The policies (606) may also include a write back policy (614) that determines which of the memory blocks in the cache should be written back to the non-volatile memory. In some examples, the write back policy (614) includes determining which of the memory blocks is likely to be finished being modified in the cache. Such a prediction may be based on patterns identified through tracking statistics. In some examples, the write back policy (614) also considers the duration of time since a memory block in the cache was last written back to the non-volatile memory.

The write back policy (614) may include a throttling sub-policy (616) that controls the amount of resources used to write back the memory blocks and the timing of the write backs. The write backs may be coordinated with other processes being carried out with the processor (600) or other components of the memory device. Writing back may occur in the background so as to not interfere with other processes. In some examples, the write backs are halted while an on demand request is being executed. In other examples, the on demand requests are a factor in determining when a write back should be made.

The write back policy (614) may also have a compaction sub-policy (618) that determines how many and what memory blocks to write back to the non-volatile memory at the same time. For examples, the compaction sub-policy (618) may include factors that consider the bandwidth needed to write back a memory block, the number of memory blocks considered appropriate to write back and whether they fit in the same row of storage in the non-volatile memory, the certainty that a particular memory block is ready for writing back, other processes being executed by the processor and/or memory device, other considerations, or combinations thereof.

In some examples, the processor (600) has a power failure policy (620) that determines how to handle the memory in the cache with the limited resources that are available during a power failure. For examples, the power failure policy (620) may automatically write back all of the memory blocks that are considered dirty. In some examples, the power failure policy includes prioritizing memory blocks for writing back to the non-volatile memory. For example, the power failure policy may first write back those memory blocks that appear to be finished being modified and next write back those memory blocks that appear to be in the middle of some significant changes. In some examples, memory blocks that are undergoing significant changes during a power failure may not have been finished with its modifications, and the user would have to make significant changes to those memory blocks anyway. The power-failure policy may invoke a process periodically to write back dirty blocks, so at any given time the number of dirty blocks in the cache is at or below a threshold.

The processor (600) may have a non-volatile memory usage tracker (622) that tracks the usage of the memory blocks in the non-volatile memory. Such a tracker (622) may track the number of writes to a memory block, the number of reads to a memory block, the frequency of writes to a memory block, the frequency of reads to a memory block, the clean/dirty status of a memory block, and whether the memory block is promoted to the cache.

When a memory block has been determined to be appropriate for promoting to the cache according to the promotion policy (608), an insertion location determiner (624) may determine the location to insert the memory block in the cache according to the insertion sub-policy (610). Further, an eviction determiner (626) may determine which memory block in the cache, if any, should be evicted to make room for the memory block being promoted. After the insertion and the eviction parameters have been determined, a cache writer (628) may write the information in the memory block into the cache.

The processor (600) may have a cache usage tracker (630) that tracks the usage of the memory blocks in the cache. Such a tracker (630) may track the number of writes to a memory block, the number of reads to a memory block, the frequency of writes to a memory block, the frequency of reads to a memory block, the clean/dirty status of a memory block, and the time duration from which the memory block was written back to the non-volatile memory.

A write back determiner (632) in the processor (600) may determine which memory blocks in the cache are appropriate to write back to the non-volatile memory according to the write back policy (614). A compaction determiner (634) may assign the memory block to be written back with a group of other memory blocks that are also considered ready for writing back.

A non-volatile memory writer throttler (636) may control write backs when the non-volatile memory writer (638) writes back the memory blocks. The non-volatile memory writer throttler (636) may rely, at least in part, on an on demand request recognizer (640) that recognizes whether the processer (600) is executing other tasks.

Figure 7:
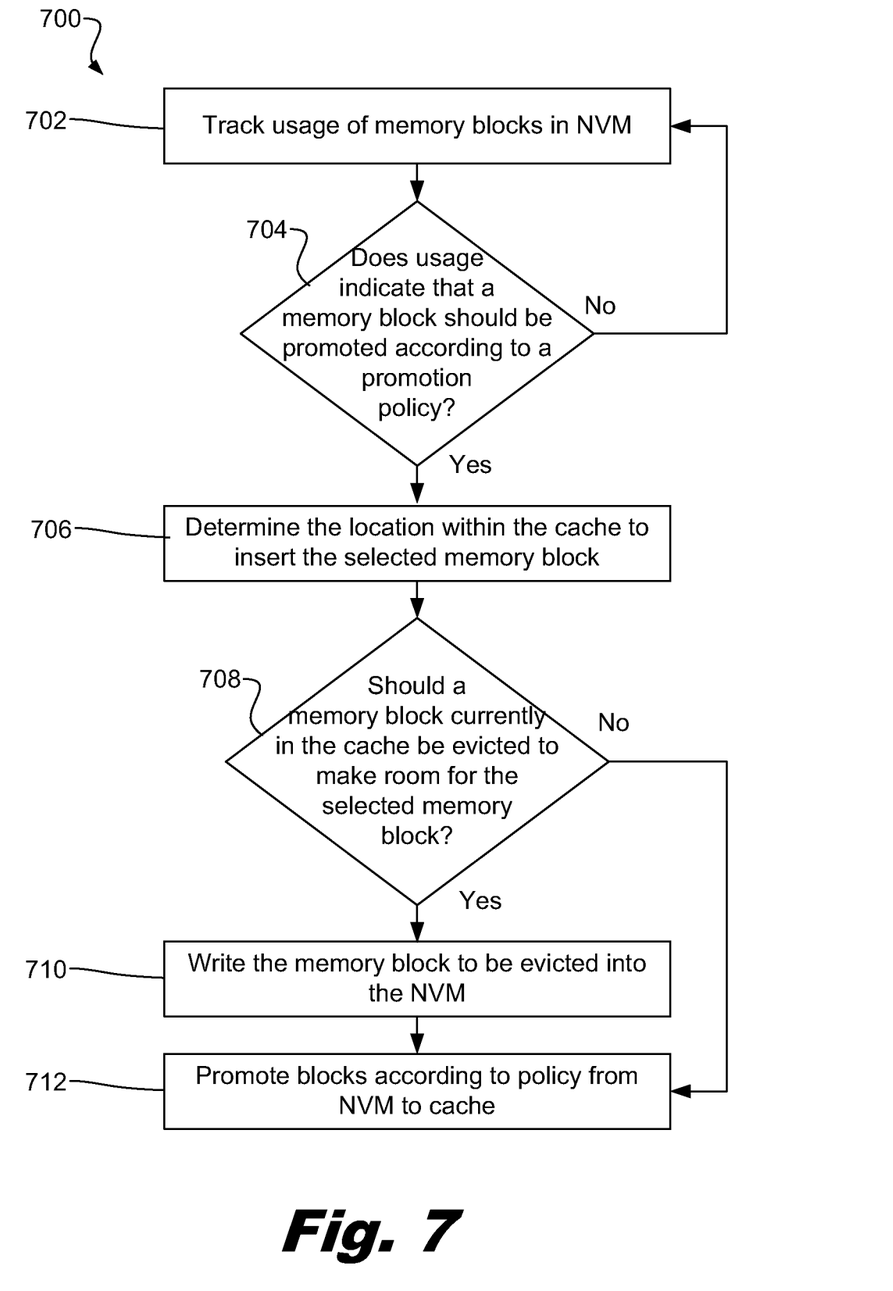
FIG. 7 is a diagram of an illustrative flowchart of a process for promoting a memory block, according to principles described herein.

FIG. 7 is a diagram of an illustrative flowchart (700) of a process for promoting a memory block, according to principles described herein. In this example, the process includes tracking (702) the usage of memory blocks in the non-volatile memory. Also, the process includes determining (704) whether the usage indicates that a memory block should be promoted according to a promotion policy. If a memory block should be promoted, the process includes determining (706) the location within the cache to insert the selected memory block and its ordering information. If no memory block should be promoted, the process includes continuing to track (702) the usage of the memory blocks.

In the illustrated example, the process also includes determining (708) whether a memory block that is currently in the cache should be evicted to make room for the selected memory block. If a memory block should be evicted, then the process in the illustrated example includes writing (710) the memory block to be evicted to the non-volatile memory. In other examples, if the memory block to be evicted is already updated in the non-volatile memory, or if no memory block needs to be evicted, the memory block may be promoted (712) into the cache.

Figure 8:
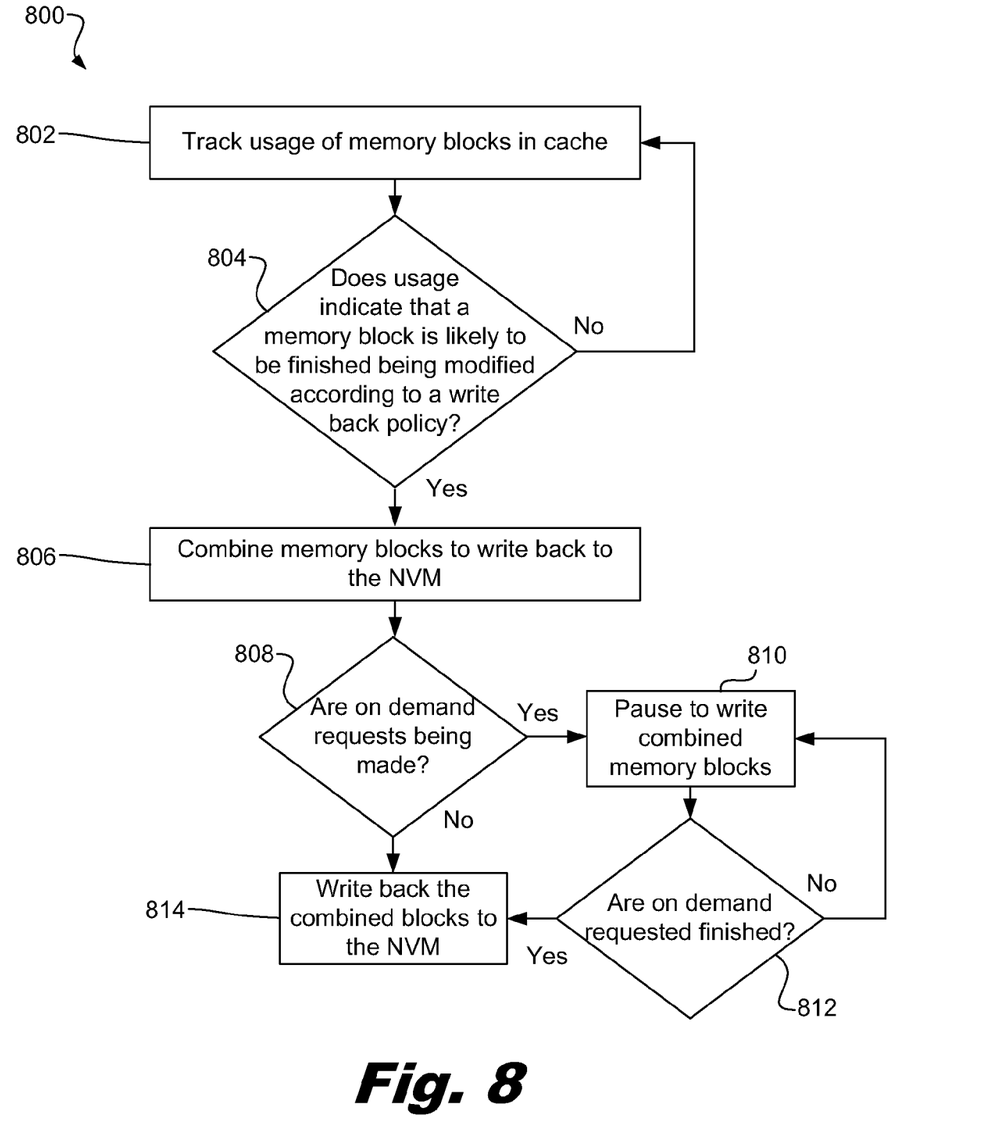
FIG. 8 is a diagram of an illustrative flowchart of a process for writing back memory blocks, according to principles described herein.

FIG. 8 is a diagram of an illustrative flowchart (800) of a process for writing back memory blocks, according to principles described herein. In this example, the process includes tracking (802) the usage of memory blocks in the cache. The process may also include determining (804) whether the usage indicated that a memory block is likely to be finished being modified according to a write back policy. If the process determines that no memory blocks are finished being modified, then process may continue to track (802) the memory blocks in the cache. However, if the process determines that a memory block is finished being modified, then process may include combining (806) multiple memory blocks together to write back to the non-volatile memory as a batch.

In the example of FIG. 8, the process may include determining (808) if any on demand requests are being made, or likely to be made in the near future, of the processor. If so, then the process may include pausing (810) to write the combined memory blocks to the non-volatile memory. The process may also include determining (812) whether the on demand requests are finished. If the on demand requests are finished, or if no on demand requests were made in the first place, then the process may include writing (814) back the combined memory blocks to the non-volatile memory.

Figure 9:
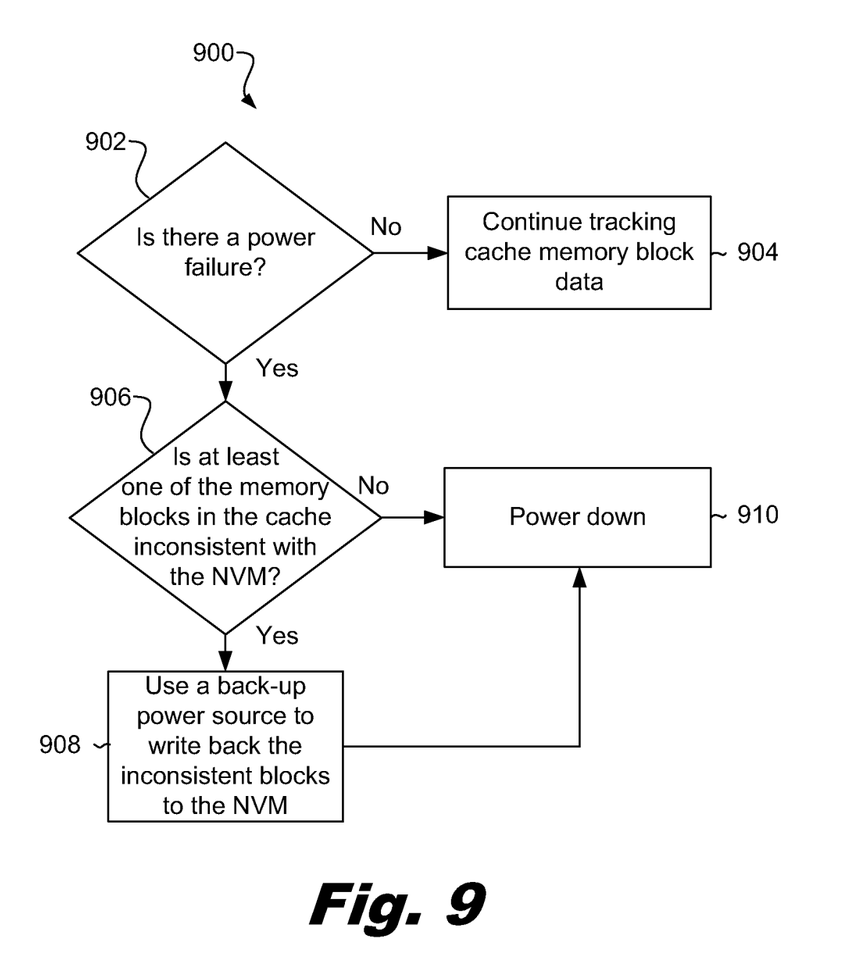
FIG. 9 is a diagram of an illustrative flowchart of a process for reacting to a power failure, according to principles described herein.

FIG. 9 is a diagram of an illustrative flowchart (900) of a process for reacting to a power failure, according to principles described herein. In this example, the process may include determining (902) whether there is a power failure. If no power failure exists, then the process may include continuing (904) to track data about the memory blocks in the cache.

If a power failure does exist, then the process may include determining (906) if at least one of the memory blocks in the cache is inconsistent with the non-volatile memory. If at least one memory block in the cache is inconsistent with the non-volatile memory, the process may include using (908) a back-up power source to write back the inconsistent memory blocks to the non-volatile memory. After the inconsistent memory blocks are written back into the non-volatile memory storage or none of the blocks were inconsistent with the non-volatile memory, the process may include powering down (910) according to a power down policy.

Figure 10:
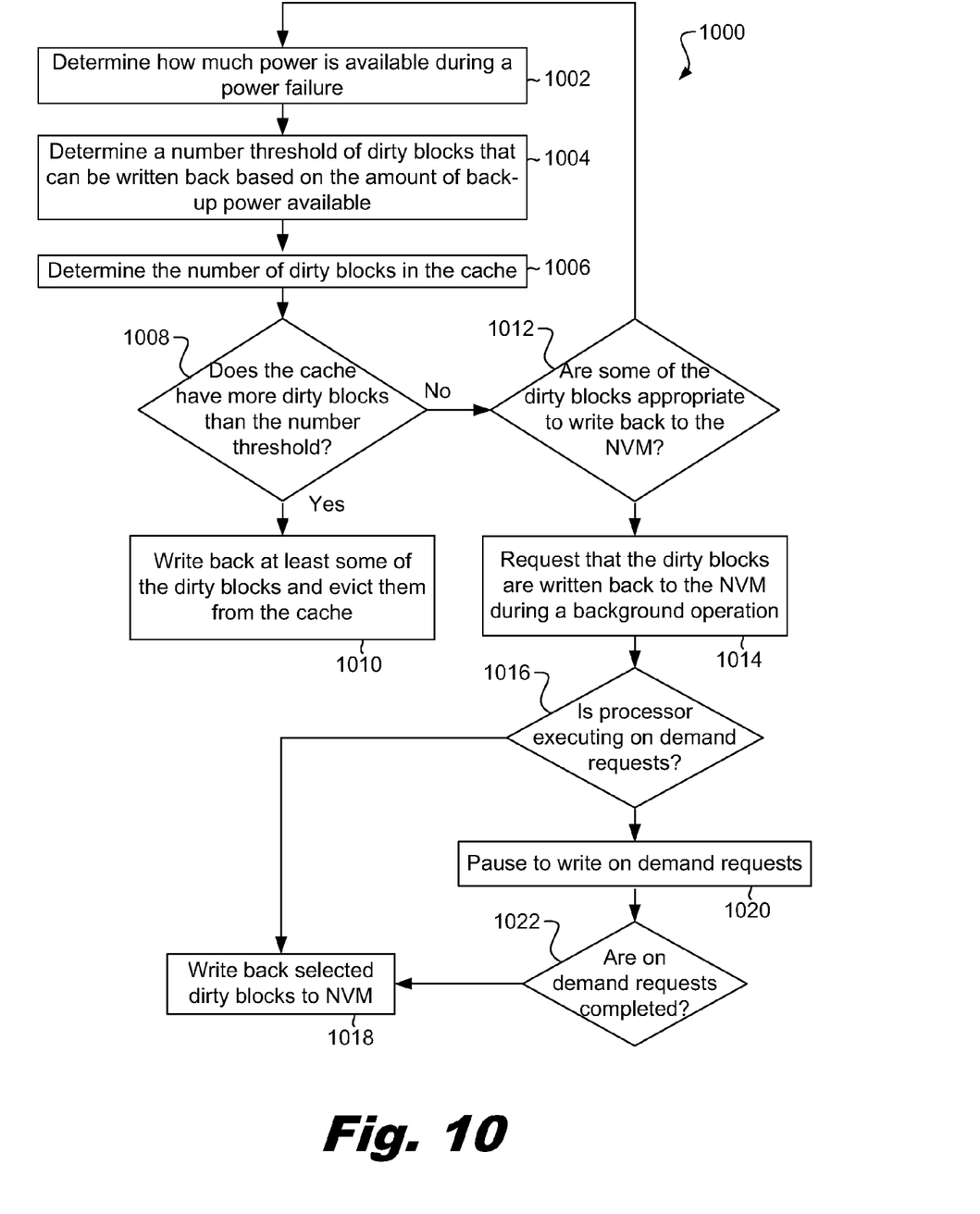
FIG. 10 is a diagram of an illustrative flowchart of a process for managing write backs, according to principles described herein.

FIG. 10 is a diagram of an illustrative flowchart (1000) of a process for managing write backs, according to principles described herein. In this example, the process includes determining (1002) how much power is available during a power failure and determining (1004) a number threshold of dirty blocks that can be written back based on the amount of back-up power available. In some examples, the number threshold equals the maximum amount of memory blocks that can be written back in the event of a power failure. In other examples, the number threshold is less than the maximum to provide a safety margin.

The process may also include determining (1006) the number of dirty blocks currently in the cache and determining (1008) if the cache has more dirty blocks than the number threshold. If the cache does have more than the number threshold, then the process may include writing back (1010) at least some of the memory blocks and evicting these memory blocks from the cache.

If the number of dirty blocks in the cache is less than the number threshold, then process may include determining (1012) if some of the dirty blocks are appropriate to write back to the non-volatile memory. If none of the memory blocks are ready to be written back, then the process may restart the process. However, if memory blocks are ready to be written back to the non-volatile memory, then the process may request (1014) that written blocks be written back into the non-volatile memory during a background operation. The process may include determining (1016) the processor is current executing on demand request. If there are no on demand requests, the process may write back (1018) the selected dirty blocks to the non-volatile memory.

If there are on demand requests, then the process may include pausing (1020) to write the dirty blocks back. When the process determines (1022) that the process is done executing the on demand requests, then the process may include writing (1018) back the dirty blocks to the non-volatile memory.

While the examples above have been described with reference to particular types of memory hybrid structures, any memory hybrid structure may be used that is compatible with the principles described herein including single memory cells and multiple memory cells. Also, while the examples above have been described with reference to particular types of memory configurations, any type of memory configuration may be used. Further, while the above examples have been described with reference to specific types of memory, any type of memory that is compatible with the principles described herein may be used.

Also, while the policies above have been described with specific examples, any policy considerations for any of the above mentioned policies and/or sub-policies that are compatible with the principles described herein may be used. Further, while the examples above have been described with reference to specific policies and sub-policies additional policies or fewer policies than described herein may be used in accordance with the principles described herein.

While the examples above have been described with particular reference to certain types of primary power sources and back-up power sources, any primary power source or back-up power source that is compatible with the principles described herein may be used including batteries, rechargeable batteries, super capacitors, other power sources, or combinations thereof. Also, while the examples above have been described with particular reference to certain types of tracked statistic or ways of tracking the usage of memory blocks, any tracking mechanism may be or any type of data may be tracked in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for storing data in persistent hybrid memory, comprising:
   identifying a memory block in non-volatile memory to promote to a cache according to a promotion policy that indicates the usage of the memory block;
   promoting the memory block from non-volatile memory to the cache;
   tracking modifications to the memory block while in the cache; and
   writing back the memory block from the cache to the non-volatile memory based on a write back policy that predicts when the memory block is finished being modified.

2. The method of claim 1, wherein the promotion policy further indicates whether the memory block is available for promotion according to a cost benefit analysis.

3. The method of claim 1, wherein the promotion policy further indicates a number of reads and writes executed on the memory block.

4. The method of claim 1, wherein the promotion policy further indicates that a memory block designated as read only is ineligible for promotion.

5. The method of claim 1, further comprising:
comparing multiple potential promotion approaches;
selecting a procedure of one of the multiple potential promotion approaches; and
adjusting the promotion policy based on a selected procedure.

6. The method of claim 1, further comprising prioritizing memory blocks for writing back to the non-volatile memory based on a power failure policy.

7. The method of claim 6, further comprising:
first, writing back memory blocks to the non-volatile memory that are finished being modified; and
second, writing back memory blocks that are mid-modification.

8. The method of claim 1, further comprising pausing a write back of the memory block from the cache to the non-volatile memory to execute an on demand request.

9. The method of claim 1, further comprising invoking an eviction policy to evict a second memory block in the cache to make room for the memory block in the cache.

10. The method of claim 9, wherein the eviction policy predicts future activity of the second memory block.

11. The method of claim 9, in which the eviction policy is invoked when the cache is full.

12. A memory device, comprising:
a hybrid memory structure comprising a non-volatile memory location and a cache; and
a processor programmed to:
identify a memory block in non-volatile memory to promote to a cache according to a promotion policy that indicates a usage of the memory block;
determine, based on an insertion sub-policy, a location within the cache where the memory block is to be inserted;
promote the memory block by moving the memory block from non-volatile memory into the location within the cache;
track modifications to the memory block while in the cache; and
write back the memory block from the cache to the non-volatile memory based on a write back policy that predicts when the memory block is finished being modified.

13. The memory device of claim 12, wherein the promotion policy varies over time.

14. The memory device of claim 13, wherein the promotion policy varies with respect to a capacity of the cache.

15. The memory device of claim 12, wherein the insertion sub-policy indicates a location where the memory block is to be inserted based on an intended usage of the memory block.

16. The memory device of claim 12, wherein the insertion sub-policy indicates a location where the memory block is to be inserted based on a difficulty of insertion, a length of time the memory block is to remain in cache, how often the memory block is to be considered for write back to the non-volatile memory, or combinations thereof.

17. A non-transitory computer readable storage medium storing computer readable program code, the computer readable program code executable by a processor, comprising:
computer readable program code to identify a first memory block in non-volatile memory to promote from the non-volatile memory to a cache based on a frequency of use of the memory block, wherein a promotion policy based on the frequency of use requires that the first memory block has been accessed in the non-volatile memory at least twice within a unit of time prior to promotion the cache;
computer readable program code to identify a location within the cache where the first memory block is to be inserted;
computer readable program code to place the first memory block from non-volatile memory to the location within the cache;
computer readable program code to evict a second memory block in said cache back to the non-volatile memory to make room for the first memory block;
computer readable program code to allow modifications to the first memory block while in the cache while preserving a corresponding memory block within the non-volatile memory; and
computer readable program code to write back the first memory block from the cache to the non-volatile memory along with a number of other memory blocks.

18. The non-transitory computer readable storage medium of claim 17, the computer readable program code further comprising:
computer readable program code to determine memory blocks within cache that are inconsistent with corresponding memory blocks within the non-volatile memory by tracking memory blocks that have been written back to the non-volatile memory: and
computer readable program code to, in the event of a power failure, write back memory blocks into the non-volatile memory that are inconsistent.

19. The non-transitory computer readable storage medium of claim 17, the computer readable program code further comprising computer readable program code to, prior to eviction, write the second memory block back to non-volatile memory.

20. The non-transitory computer readable storage medium of claim 17, the computer readable program code further comprising computer readable program code to write back the memory block and the number of other memory blocks to a same non-volatile memory row.

* * * * *